US012369216B2

(12) United States Patent
Jang et al.

(10) Patent No.: US 12,369,216 B2
(45) Date of Patent: Jul. 22, 2025

(54) METHOD AND DEVICE FOR REDUCING POWER CONSUMPTION OF STATIONARY TERMINAL IN WIRELESS COMMUNICATION SYSTEM

(71) Applicant: Samsung Electronics Co., Ltd., Suwon-si (KR)

(72) Inventors: Jaehyuk Jang, Suwon-si (KR); Soenghun Kim, Suwon-si (KR); Anil Agiwal, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 442 days.

(21) Appl. No.: 17/911,894

(22) PCT Filed: Mar. 18, 2021

(86) PCT No.: PCT/KR2021/003384
§ 371 (c)(1),
(2) Date: Sep. 15, 2022

(87) PCT Pub. No.: WO2021/194166
PCT Pub. Date: Sep. 30, 2021

(65) Prior Publication Data
US 2023/0138415 A1 May 4, 2023

(30) Foreign Application Priority Data
Mar. 24, 2020 (KR) .................. 10-2020-0035861

(51) Int. Cl.
*H04W 76/19* (2018.01)

(52) U.S. Cl.
CPC .................. *H04W 76/19* (2018.02)

(58) Field of Classification Search
None
See application file for complete search history.

(56) References Cited

U.S. PATENT DOCUMENTS 9,854,496 B2 * 12/2017 Johansson ........... H04W 36/302
10,440,691 B2 * 10/2019 Hong ..................... H04L 67/63
(Continued)

FOREIGN PATENT DOCUMENTS

| KR | 10-2015-0021490 A | 3/2015 |
| KR | 10-2021-0020397 A | 8/2019 |

(Continued)

*Primary Examiner* — Adolf Dsouza
(74) *Attorney, Agent, or Firm* — Jefferson IP Law, LLP

(57) ABSTRACT

A method performed by a UE in a wireless communication system is provided. The method includes transmitting a UE capability information message including information indicating that the UE is in a fixed state, based on the information included in the UE capability information message, receiving, from the base station, a first radio resource control (RRC) message including information for configuring the UE not to perform a measurement for a signal strength of a neighbor base station, transmitting, to the base station, a second RRC message as a response to the first RRC message, receiving a third RRC message for transitioning the UE to an RRC idle state, based on the third RRC message, transitioning to the RRC idle state, and receiving a paging message in the RRC idle state, the UE in the fixed state receives the paging message from the base station which the UE performed the last access.

10 Claims, 7 Drawing Sheets

(56) References Cited

U.S. PATENT DOCUMENTS

| | | | |
|---|---|---|---|
| 10,917,933 B2 | 2/2021 | Kim et al. | |
| 11,184,928 B2 * | 11/2021 | Jia | H04W 48/20 |
| 11,445,567 B2 * | 9/2022 | Shih | H04W 76/27 |
| 2014/0044029 A1 | 2/2014 | Chou et al. | |
| 2015/0163745 A1 * | 6/2015 | Kim | H04W 76/28 |
| | | | 370/311 |
| 2015/0173017 A1 | 6/2015 | Rakotoharison et al. | |
| 2019/0268963 A1 * | 8/2019 | Kim | H04W 48/18 |
| 2022/0279595 A1 | 9/2022 | Jang et al. | |

FOREIGN PATENT DOCUMENTS

| | | |
|---|---|---|
| KR | 10-2019-0101821 A | 9/2019 |
| WO | 2016/140403 A1 | 9/2016 |

* cited by examiner

METHOD AND DEVICE FOR REDUCING POWER CONSUMPTION OF STATIONARY TERMINAL IN WIRELESS COMMUNICATION SYSTEM

TECHNICAL FIELD

The disclosure relates to a method for reducing power consumption of a stationary fixed UE among "NR-light/NR-lite" UEs having reduced price and complexity in a wireless communication system or 3GPP 5G new radio (NR).

BACKGROUND ART

To meet the increasing demand for wireless data traffic since the deployment of 4G communication systems, efforts have been made to develop an improved 5th generation (5G) or pre-5G communication system. Therefore, the 5G or pre-5G communication system is also called a "beyond 4G network" communication system or a "post long term evolution (LTE) system."

Implementation of the 5G communication system in ultra-high frequency (mmWave) bands, e.g., 60 GHz bands, is being considered in order to accomplish higher data rates. To mitigate a path loss of radio waves in the ultrahigh frequency bands and increase the transmission distance on the radio waves in the ultrahigh frequency bands, technologies of beamforming, massive multiple-input multiple-output (massive MIMO), full dimensional MIMO (FD-MIMO), array antenna, analog beamforming, and large scale antennas have been discussed for 5G communication systems.

In addition, in 5G communication systems, development for system network improvement is underway based on evolved small cells, advanced small cells, cloud radio access networks (cloud RANs), ultra-dense networks, device-to-device (D2D) communication, wireless backhaul, moving network, cooperative communication, coordinated multi-points (CoMP), reception-end interference cancellation, and the like.

In addition, in the 5G system, hybrid frequency shift keying and quadrature amplitude modulation (FQAM) and sliding window superposition coding (SWSC), as advanced coding modulation (ACM) methods, and filter bank multi carrier (FBMC), non-orthogonal multiple access (NOMA), and sparse code multiple access (SCMA), as advanced access technologies, have been developed.

In the 5G system, support for various services has been considered as compared with the existing 4G system. For example, most representative services may be an enhanced mobile broadband (eMBB), ultra-reliable and low latency communication (URLLC), massive machine type communication (mMTC), and evolved multimedia broadcast/multicast service (eMBMS). Further, a system that provides the URLLC service may be called a URLLC system, and a system that provides the eMBB service may be called an eMBB system. Further, the terms "service" and "system" may be interchangeably used.

Among them, the URLLC service, unlike the existing 4G system, is a service that is newly considered in the 5G system, and requires satisfaction of the ultra-reliable (e.g., packet error rate of about 10-5) and low latency (e.g., about 0.5 msec) conditions. In order to satisfy such strict requirements, the URLLC service may require application of a transmission time interval (TTI) that is shorter than that of the eMBB service, and various operation methods utilizing this have been considered.

On the other hand, the Internet is evolving from a human-centered connection network where humans generate and consume information to an internet of things (IoT) network that exchanges and processes information between distributed components such as things. The internet of everything (IoE), which is a combination of IoT technology and big data processing technology through connection with a cloud server, has also emerged. Technology elements, such as "sensing technology", "wired/wireless communication and network infrastructure", "service interface technology", and "security technology" have been demanded for IoT implementation; therefore, technologies, such as a sensor network, machine-to-machine (M2M) communication, machine type communication (MTC) for a connection between things, are recently being studied.

Such an IoT environment may provide intelligent internet technology (IT) services that create a new value for human life by collecting and analyzing data generated among connected things. IoT may be applied to a variety of fields including smart home, smart building, smart city, smart car or connected car, smart grid, health care, smart appliances, and advanced medical services through convergence and combination between existing information technology (IT) and various industrial applications.

In line with this, various attempts have been made to apply 5G communication systems to IoT networks. For example, technologies such as a sensor network, machine-to-machine (M2M) communication, and machine type communication (MTC) may be implemented by techniques of beamforming, MIMO, and array antennas, which correspond to the 5G communication technology. Application of a cloud radio access network (cloud RAN) as the above-described big data processing technology may also be considered to be an example of convergence between the 5G technology and the IoT technology.

DISCLOSURE OF INVENTION

Technical Problem

An aspect of the disclosure is to provide a method for reducing power consumption of a stationary fixed UE among NR-lite UEs and for reducing waste of radio resources due to paging transmission by transmitting paging to specific base stations other than unspecified base stations when paging to a UE in an idle mode.

Technical problems intended to be solved in the disclosure are not limited to the above-mentioned technical problems, and other unmentioned technical problems will be able to be clearly understood by those of ordinary skill in the art to which the disclosure pertains from the following description.

Solution to Problem

According to an embodiment of the disclosure to solve the above problems, a method performed by a UE in a wireless communication system includes: transmitting a connection establishment request message to a base station; receiving a connection establishment message from the base station; and transmitting a connection establishment complete message to the base station, wherein the connection establishment complete message includes mobility information of the UE, and the mobility information includes information notifying that the UE is a stationary UE.

Further, according to another embodiment of the disclosure, a method performed by a base station in a wireless communication system includes: receiving a connection establishment request message from a UE; transmitting a connection establishment message to the UE; and receiving a connection establishment complete message from the UE, wherein the connection establishment complete message includes mobility information of the UE, and the mobility information includes information notifying that the UE is a stationary UE.

Further, according to another embodiment of the disclosure, a UE in a wireless communication system includes: a transceiver; and a controller configured to transmit a connection establishment request message to a base station through the transceiver, receive a connection establishment message from the base station through the transceiver, and transmit a connection establishment complete message to the base station through the transceiver, wherein the connection establishment complete message includes mobility information of the UE, and the mobility information includes information notifying that the UE is a stationary UE.

Further, according to another embodiment of the disclosure, a base station in a wireless communication system includes: a transceiver; and a controller configured to receive a connection establishment request message from a UE through the transceiver, transmit a connection establishment message to the UE through the transceiver, and receive a connection establishment complete message from the UE through the transceiver, wherein the connection establishment complete message includes mobility information of the UE, and the mobility information includes information notifying that the UE is a stationary UE.

Advantageous Effects of Invention

According to an embodiment of the disclosure, it is possible to reduce power consumption of a fixed UE and to reduce waste of radio resources due to paging transmission by transmitting paging to specific base stations other than unspecified base stations when paging to a UE in an idle mode.

Effects that can be obtained in the disclosure are not limited to the above-mentioned effects, and other unmentioned effects will be able to be clearly understood by those of ordinary skill in the art to which the disclosure pertains from the following description.

MODE FOR THE INVENTION

Hereinafter, an operation principle of the disclosure is described in detail with reference to the accompanying drawings. In describing the disclosure, a detailed description of a related known function or constitution will be omitted if it is deemed to make the gist of the disclosure unnecessarily vague. Furthermore, terms to be described hereunder have been defined by taking into consideration functions in the disclosure, and may be different depending on a user, an operator's intention or practice. Accordingly, each term should be defined based on contents over the entire specification. In the following description, a term to identify an access node, a term to denote network entities, a term to denote messages, a term to denote an interface between network entities, and a term to denote a variety of types of identity information have been illustrated for convenience of description. Accordingly, the disclosure is not limited to the following terms, and other terms to denote targets having equivalent technical meanings may be used.

For convenience in explanation, in the disclosure, terms and names, which are defined in the LTE and NR standards that are the latest standards defined in the 3rd Generation Partnership Project (3GPP) group among the currently existing communication standards, are used. However, the disclosure is not restricted by the terms and names, and it may be equally applied to systems complying with other standards. In particular, the disclosure may be applied to the 3GPP NR (5th generation mobile communication standards).

Figure 1:
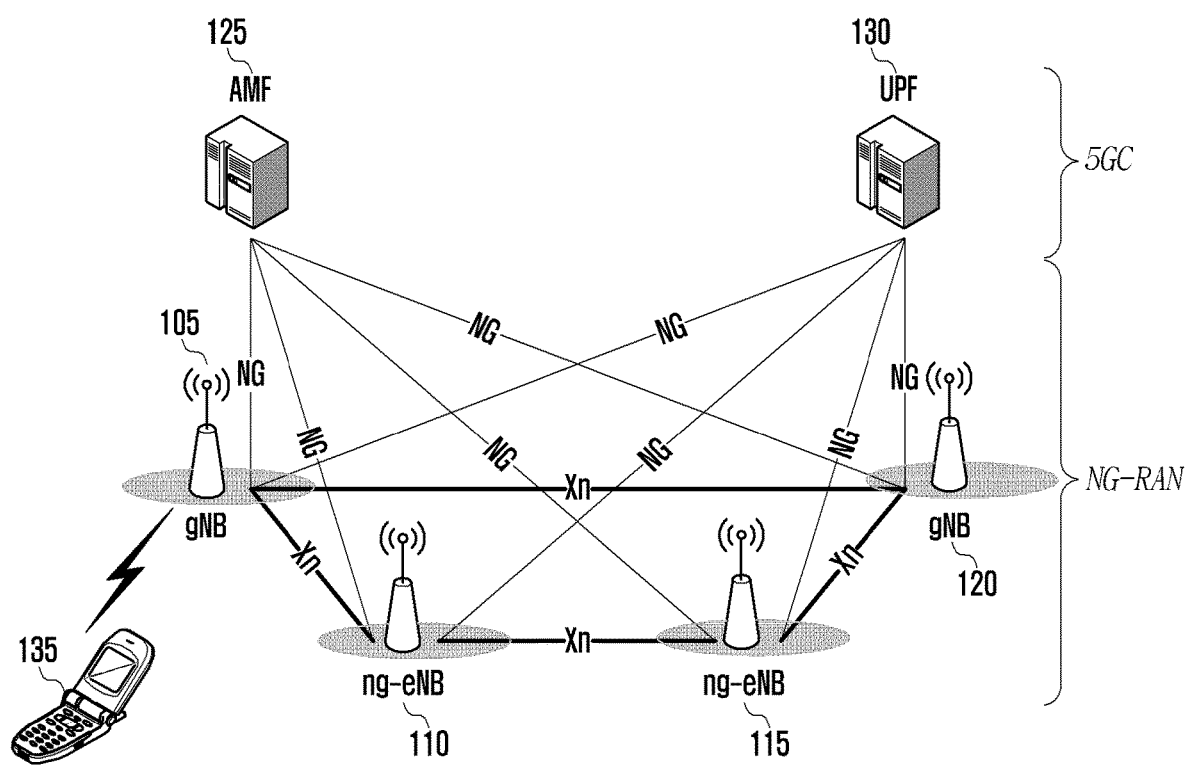
FIG. 1 is a diagram illustrating the structure of an NR system according to an embodiment of the disclosure.

FIG. 1 is a diagram illustrating the structure of an NR system according to an embodiment of the disclosure.

With reference to FIG. 1, a wireless communication system may be composed of several base stations 105, 110, 115, and 120, an access and mobility management function (AMF) 120, and a user plane function (UPF) 130. A user equipment (hereinafter, UE or terminal) 135 may access an external network through the base stations 105, 110, 115, and 120 and the UPF 130.

The base stations 105, 110, 115, and 120 are access nodes of a cellular network, and may provide radio accesses to the UEs. That is, in order to service traffics of users, the base stations 105, 110, 115, and 120 may support connections between the UEs and a core network (CN) (in particular, CN of the NR is called 5GC) by collecting and scheduling state information, such as buffer states of UEs, available transmission power states, and channel states. Meanwhile, in the communication, a user plane (UP) related to actual user data transmission and a control plane (CP) such as a connection management may be dividedly configured, and in the drawing, gNBs 105 and 120 may use the UP and CP technology defined in the NR technology, and ng-eNBs 110 and 115, although being connected to the 5GC, may use the UP and CP technology defined in the LTE technology.

The AMF or a session management function (SMF) 125 is a device in charge of not only a mobility management function of the UE but also various kinds of control functions, and may be connected to a plurality of base stations, and the UPF 130 is a kind of gateway device providing data transmission.

Figure 2:
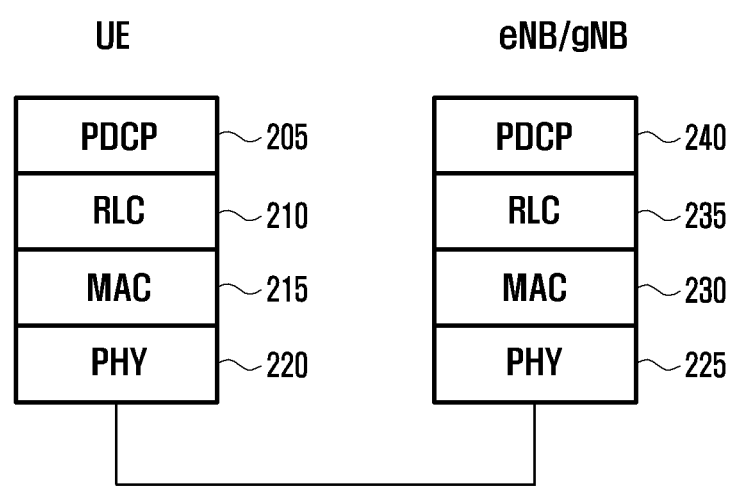
FIG. 2 is a diagram illustrating a radio protocol structure in LTE and NR systems according to an embodiment of the disclosure.

FIG. 2 is a diagram illustrating a radio protocol structure in LTE and NR systems according to an embodiment of the disclosure.

With reference to FIG. 2, in a UE or an eNB/gNB, a radio protocol of LTE and NR systems is composed of a packet data convergence protocol (PDCP) 205 or 240, a radio link control (RLC) 210 or 235, and a medium access control (MAC) 215 or 230. The packet data convergence protocol (PDCP) 205 or 240 may take charge of IP header compression/decompression operations, and the radio link control (hereinafter, referred to as "RLC") 210 or 235 may reconfigure a PDCP protocol data unit (PDU) with a proper size. The MAC 215 or 230 may be connected to several RLC layer devices configured in one UE, and may perform multiplexing of RLC PDUs into MAC PDU and demultiplexing of the RLC PDUs from the MAC PDU. A physical layer 220 or 225 may perform channel coding and modulation of higher layer data to configure and transmit orthogonal frequency division multiplexing (OFDM) symbols on a radio channel, or may perform demodulation and channel decoding of the OFDM symbols received on the radio channel to transfer the demodulated and channel-decoded OFDM symbols to a higher layer. Further, even in the physical layer, a hybrid automatic repeat request (HARQ) is used for additional error correction, and a receiving end may transmit whether to receive a packet transmitted from a transmitting end through 1 bit. This is called HARQ acknowledgement/negative acknowledgement (HARQ ACK/NACK) information. In case of the LTE, downlink HARQ ACK/NACK information for uplink data transmission may be transmitted on a physical hybrid-ARQ indicator channel (PHICH), and in case of the NR, a physical downlink control channel (PDCCH) that is a channel on which downlink/uplink resource allocation or the like is transmitted may determine whether retransmission is necessary or whether a new transmission is to be performed through scheduling information of the corresponding UE. This is because asynchronous HARQ is applied in the NR. Uplink HARQ ACK/NACK information for the downlink data transmission may be transmitted on a physical uplink control channel (PUCCH) or a physical uplink shared channel (PUSCH). The PUCCH may be generally transmitted from the UE onto an uplink of a PCell to be described later, and in case that the UE supports this, the PUCCH may be additionally transmitted from the corresponding UE onto an uplink of an SCell to be described later, and may be called a PUCCH SCell.

Although not illustrated in the drawing, radio resource control (RRC) layers may exist above PDCP layers of the UE and the base station, and the RRC layers may send or receive a configuration control message related to an access and measurement to or from each other for a radio resource control.

Meanwhile, a signal that is transmitted through the PHY layer may be composed of one or a plurality of frequencies (carriers), and a technology in which one base station simultaneously configures and uses a plurality of frequencies is referred to as carrier aggregation (hereinafter, referred to as "CA"). The CA technology means a technology that can remarkably increase a transmission amount as many as the number of subcarriers by additionally using one main carrier and one or a plurality of subcarriers instead of using only one carrier for communication between a user equipment (UE or terminal) and a base station (eNB of LTE or gNB of NR). Meanwhile, in the LTE, a cell in a base station that uses the main carrier is called a primary cell (PCell), and a cell in the base station that uses the subcarrier is called a secondary cell (SCell). A technology in which the CA technology is extended to two base stations may be called dual connectivity (hereinafter, referred to as "DC"). In the DC technology, the UE may be simultaneously connected to and use a master base station (master E-UTRAN nodeB, hereinafter, referred to as "MeNB") and a secondary base station (secondary E-UTRAN nodeB, hereinafter, referred to as "SeNB"), and cells belonging to the master base station may be called a master cell group (hereinafter, referred to as "MCG"), and cells belonging to the secondary base station may be called a secondary cell group (hereinafter, referred to as "SCG"). A representative cell exists for each cell group, and the representative cell of the master cell group is called a primary cell (hereinafter, referred to as "PCell"), and the representative cell of the secondary cell group is called a primary secondary cell (hereinafter, referred to as "PSCell"). In case of using the above-described NR, the UE may simultaneously use the LTE and the NR by using the LTE technology for the MCG and using the NR for the SCG. In the NR, each cell group (i.e., MCG or SCG) may have up to 16 serving cells (in case of the MCG, PCell and SCells, and in case of the SCG, PSCell and S Cells).

Although not illustrated in the drawing, on an upper side of a PDCP layer of the UE and the base station, a radio resource control (hereinafter, referred to as "RRC") layer exists, and the RRC layer may send and receive a configuration control message related to an access and measurement for radio resource control. For example, the base station may instruct the UE to perform measurement by using a message of the RRC layer, and the UE may report the measurement result to the base station by using the message of the RRC layer.

Figure 3:
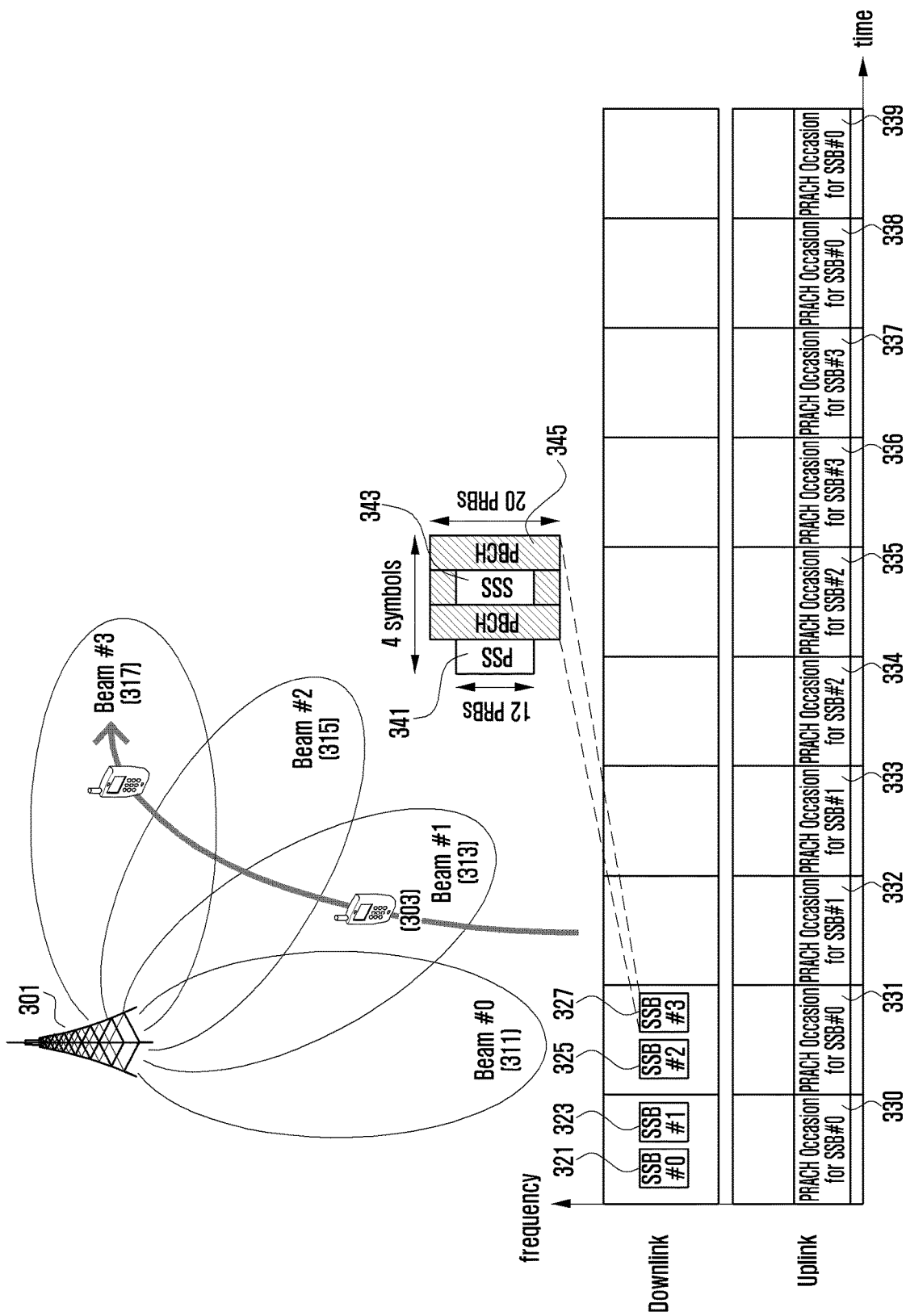
FIG. 3 is a diagram illustrating an example of a downlink channel frame structure and an uplink channel frame structure in case that an NR system performs beam-based communication according to an embodiment of the disclosure.

FIG. 3 is a diagram illustrating an example of a downlink channel frame structure and an uplink channel frame structure in case that an NR system performs beam-based communication according to an embodiment of the disclosure.

With reference to FIG. 3, in order to transmit a wider coverage or a stronger signal, a base station 301 may transmit a signal in the form of beams 311, 313, 315, and 317. Accordingly, a UE 303 in a cell should transmit and receive data by using a specific beam (in the present exemplary drawing, beam #1 313) that is transmitted by the base station.

Meanwhile, the state of the UE may be divided into an idle mode (RRC_IDLE) state and a connected mode (RRC_CONNECTED) state depending on whether the UE is connected to the base station. Accordingly, the base station may not be aware of the location of the UE that is in an idle mode state.

If the UE in the idle mode state is intended to transition to the connected mode state, the UE may receive synchronization signal blocks (SSBs) 321, 323, 325, and 327 that are transmitted by the base station. The SSBs are SSB signals that are periodically transmitted in accordance with a period configured by the base station, and the SSBs may be divided into a primary synchronization signal (PSS) 341, a secondary synchronization signal (SSS) 343, and a physical broadcast channel (PBCH).

In the present exemplary drawing, a scenario in which the SSB is transmitted for each beam may be assumed. For example, it may be assumed that SSB #0 321 is transmitted by using beam #0 311, SSB #1 323 is transmitted by using beam #1 313, SSB #2 325 is transmitted by using beam #2 315, and SSB #3 327 is transmitted by using beam #3 317.

Further, in case that the UE in the connected mode performs a random access, the UE may transmit and receive data by using the corresponding beam through the SSB that is received at a time when the UE performs the random access.

Accordingly, in the present drawing, the UE may receive the SSB #1 that is transmitted by the beam #1. If the UE receives the SSB #1, the UE may obtain a physical cell identifier (PCI) of the base station through the PSS and the SSS, and through reception of the PBCH, the UE may grasp not only information on the currently received SSB identifier (i.e., SSB #1) and at which location in a 10 ms frame the current SSB is received but also which system frame number (SFN) is present in the SFN having a period of 10.24 seconds. Further, a master information block (MIB) is included in the PBCH, and the MIB notifies at which location a system information block type 1 (SIB1) that broadcasts more detailed cell configuration information can be received. If the SIB1 is received, the UE may be aware of the total number of SSBs being transmitted by the base station, and may grasp the location (in the present exemplary drawing, a scenario in which allocation is made every 1 ms is assumed: from 330 to 339) of a physical random access channel (PRACH) occasion capable of performing a random access for being transitioned to the connected mode state (more accurately, capable of transmitting a preamble that is a physical signal specially designed to match uplink synchronization). In addition, based on the information, it can be known which of the PRACH occasions is mapped onto which SSB index. For example, in the present exemplary drawing, a scenario in which the allocation is made every 1 ms is assumed, and a scenario in which ½ SSB is allocated per PRACH occasion (i.e., two PRACH occasions per SSB) is assumed. Accordingly, a scenario in which two PRACH occasions are allocated for each SSB from the start of the PRACH occasion that starts in accordance with the SFN value is illustrated. That is, this is a scenario in which PRACH occasions of 330 and 331 are allocated for SSB #0, and PRACH occasions of 332 and 333 are allocated for SSB #1. After two PRACH occasions are allocated to each of all SSBs, the PRACH occasions of 338 and 339 are allocated again to the first SSB (e.g., SSB #0).

Accordingly, the UE recognizes the locations of the PRACH occasions 332 and 333 for SSB #1, and thus transmits a random access preamble to the fastest PRACH occasion of the PRACH occasions 332 and 333 corresponding to SSB #1 at this point. For example, if it is determined that the PRACH occasion 332 of the PRACH occasions 332 and 333 is the fastest PRACH occasion, the UE may transmit the random access preamble to the PRACH occasion 332. Since the base station has received the preamble from the PRACH occasion 332, it may be aware that the UE has selected SSB #1 and has transmitted the preamble thereto. Accordingly, when the subsequent random access is performed, the data can be transmitted and received through the corresponding beam (beam #1 313).

Meanwhile, even in case that the UE in the connected state moves from the current base station (source base station) to a target base station because of handover or the like, the UE may perform a random access in the target base station, and may transmit the random access preamble by selecting the SSB in the above-described method. Furthermore, during the handover, a handover command for the UE to move from the source base station to the target base station may be transmitted to the UE through a message. In this case, the message may include a UE-dedicated random access preamble identifier that can be used when the random access is performed in the target base station. The UE-dedicated random access preamble identifier may be allocated for each SSB of the target base station. In this case, the base station may not allocate the dedicated random access preamble identifier with respect to all beams depending on the current location of the UE, and thus the dedicated random access preamble identifier may not be allocated to some SSBs. For example, the dedicated random access preamble identifier may be allocated to beam #2 and beam #3 only. If the dedicated random access preamble identifier has not been allocated to the SSB selected to transmit the preamble to the base station, the UE may perform the random access by optionally selecting a competition-based random access preamble. For example, in the present drawing, if the UE that is first located in beam #1 performs the random access, but has failed, a scenario in which the UE is located in beam #3 and transmits the dedicated random access preamble again when transmitting the random access preamble is possible. If the preamble retransmission occurs even in one random access procedure, a competition-based random access procedure and a non-competition-based random access procedure may coexist depending on whether the dedicated random access preamble identifier is allocated to the selected SSB whenever each preamble is transmitted.

Figure 4:
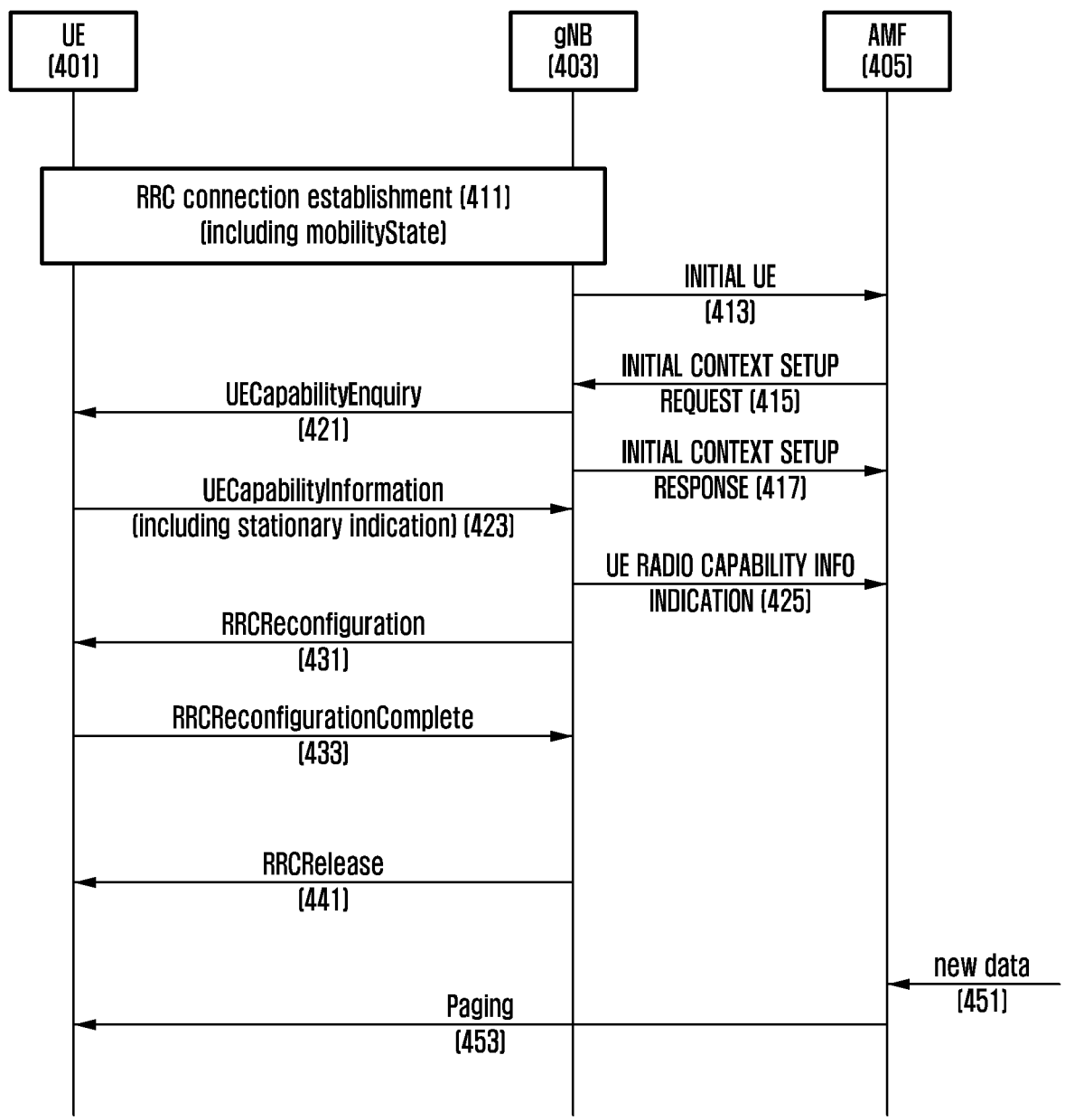
FIG. 4 is a diagram illustrating the order of operations of a UE, a base station, and an AMF entity in order for a stationary NR-lite UE to perform a connection to a network according to an embodiment of the disclosure.

FIG. 4 is a diagram illustrating the order of operations of a UE, a base station, and an AMF entity in order for a stationary NR-lite UE to perform a connection to a network according to an embodiment of the disclosure.

With reference to FIG. 4, although description is made on the assumption that a UE in a first power-on state accesses a network, the contents of the disclosure are not limited to the corresponding contents. A stationary NR-lite UE in an idle state (RRC_IDLE) may select and camp on a base station that supports the NR-lite, and may attempt a connection setup to the base station for registration in the network. During the connection setup, the UE may transmit a connection setup request message (RRCSetupRequest) of an RRC layer while performing the random access procedure to the base station, may receive a connection setup message (RRCSetup) from the base station, and may complete the RRC connection setup procedure by retransmitting a connection setup complete message (RRCSetupComplete) to the base station (411). In this case, the UE may report a mobility state of the UE in the idle state in the connection setup complete message, and in this case, may notify that the UE is in a stationary state or in a fixed state. Although not illustrated in the drawing, the mobility information of the UE may also be included in a resume complete message (RRCResumeComplete) that is a message being used when the UE is transitioned from the idle state (RRC_IDLE) and an inactive state (RRC_INACTIVE) of the connected state to the connected state (RRC_CONNECTED). Further, as a part of transmitting information on previously visited cells (visitedCellInfoList) in order to provide the UE mobility state information to the base station after the UE is transitioned to the connected state, it may be notified that the UE is in the stationary state or in the fixed state in UEAssistanceInformation. If the UE is in the stationary state, it may mean that the UE is temporarily in a static state, and if the UE is in the fixed state, it may mean that the UE is continuously in the fixed state. In order to determine that the UE is in the stationary state or in the fixed state, the UE may determine whether the UE is in the stationary state or in the fixed state in accordance with the previously configured information through the memory of the UE. Further, the UE may determine whether the UE is in the stationary state or in the fixed state in accordance with the number of times of (re)selections while the UE moves among cells in a predetermined time.

Further, it is possible to report the stationary state or the fixed state in the RRCSetupComplete and RRCResumeComplete messages only in case that information that the base station supports the UE in the stationary state or in the fixed state is transmitted as an SIB message. If the base station does not transmit the information that the base station supports the UE in the stationary state or the UE in the fixed state to the UE, the UE is unable to report the stationary state or the fixed state to the base station, and thus the UE may report the mobility related information in accordance with the number of times of (re)selections while the UE moves among the cells in the predetermined time, or may report information on always normal mobility or low mobility.

Meanwhile, the connection setup complete message (RRCSetupComplete) may include a registration request message that is transmitted to a core network, and the registration request message may be included in an INITIAL UE message that is a message between the base station and the AMF, and may be transmitted to the AMF (413). If it is notified that the UE is in the stationary state or in the fixed state in the connection setup complete message (RRCSetupComplete) as in the above example, the base station may include the corresponding information in the INITIAL UE message and may transmit the INITIAL UE message.

The AMF having received the corresponding message may transmit an initial context setup request message to the base station in order to complete the registration of the corresponding UE (415). If the UE has already been registered, the AMF stores UE radio capability information received from the UE, and thus may include the UE radio capability information in the initial context setup request message to be transferred to the base station. However, in the present exemplary drawing, since the UE initially accesses the network in the scenario, the AMF is in a state where it has not yet obtained the UE radio capability information of the corresponding UE. Accordingly, the UE may transmit, to the base station 403, the initial context setup request message that does not include the UE radio capability information.

In order to be able to perform communication with the UE, the base station should be aware what kind of capability the UE has, and thus may transmit a UECapabilityEnquiry message of an RRC layer to the UE in order to request the UE radio capability information from the UE (421). Accordingly, the UE may include the UE radio capability information owned by the UE in a UECapabilityInformation message of the RRC layer, and may transmit the UECapabilityInformation message to the base station (423). In this case, the UE may notify that the UE is an NR-lite UE, and may additionally notify whether the corresponding UE is in the stationary state or in the fixed state. The UE radio capability information for notifying whether the UE is in the stationary state or in the fixed state may be a parameter that can be commonly configured without distinction between FDD and TDD, and may be a parameter that can be commonly configured without distinction between FR1 having the operating frequency of 7 GHz or less and FR2 having the operating frequency of 7 GHz or more.

The base station having received the UE radio capability information may store the received information in the base station, and then the AMF may store the corresponding information in order to reuse the same thereafter. Accordingly, the base station may include UE radio capability information element (IE) (information transfer unit in a message) in a UE RADIO CAPABILITY INFO INDICATION message to be transferred to the AMF (425). Further, the base station may utilize the corresponding information in a paging transfer procedure. Based on the UE radio capability information received from the UE, information notifying whether the UE is in the stationary state or in the fixed state may be included in a UE Radio Capability for Paging IE, and may be transmitted to the AMF, and information on a location accessed by the corresponding UE (e.g., base station identifier or physical channel identifier) may be included and may be additionally transmitted.

Further, when configuring various kinds of functions to the UE based on the corresponding information, the base station may not configure a function necessary for mobility. For example, in order to determine whether it is necessary for the UE to move to another base station, the existing base station may configure the UE to report the result of measuring the signal strength of a neighboring base station in accordance with a specific condition. The above procedure becomes possible through the RRCReconfiguration message of the RRC layer (431).

However, in case that the UE is in the stationary state or in the fixed state as described above, the base station may configure the UE not to measure the signal strength of the neighboring base station. Furthermore, the base station may implicitly include an indicator for causing the UE not to perform the related measurement in the RRCReconfiguration message to be transmitted. The UE having received the RRCReconfiguration message transmits an RRCReconfigurationComplete message notifying that the UE has successfully received the message (433).

Thereafter, the base station may grasp the amount of data transmission/reception of the UE, and if there is not any more UE activity, the base station may configure the corresponding UE again to an idle mode. This may be instructed using the RRCRelease message of the RRC layer (441). Thereafter, in order to identify whether there is data 451 to be transmitted from the network to the corresponding UE, the UE may identify existence/nonexistence of the data by receiving a paging message from the cell that the UE periodically camps on.

Meanwhile, after the UE is transitioned to the idle mode, the base station 403 may delete all information related to the corresponding UE. Accordingly, in case that the UE moves to and camps on another cell, the network is unable to grasp where the UE exists. Accordingly, the UE in the idle state may determine whether a tracking area code value included in the SIB message transmitted by the corresponding base station is changed whenever the UE moves through cells, and if the tracking area code value has been changed, the UE may re-perform a location registration procedure by connecting to the network. Further, the network may transmit the paging message to the UE by transmitting the paging message to all base stations that use the same tracking area code. Although the number of base stations being managed by one AMF may differ depending on the operation method of a service provider, a very large number of base stations may be managed by one AMF. However, in case of a stationary UE as in the disclosure, it may transmit the paging message only to the base station to which the UE has performed the last access. For this, when transmitting an initial paging message, the UE may transmit the paging message only to the base station to which the UE has performed the last access, and if there is not a response (after once or plural times of attempts), the UE may transmit the paging message by extending a range in which the paging message is transmitted to the base stations of the last tracking area code of the corresponding UE. That is, in case that the UE is in the stationary state or in the fixed state, the number of paging attempts may be reduced through reduction of the number of base stations to which the paging message should be transmitted.

Meanwhile, although not described in the present drawing, in case of the physical movement, the UE in the idle mode may perform a procedure of (re)selecting a close neighboring cell. In case that the UE is in the stationary state or in the fixed state as described above, the UE may not perform the cell (re)selection procedure at all, or may perform the cell (re)selection procedure in a quite slower period than that of a general UE.

Further, in case of performing the cell (re)selection procedure in the stationary state or in the fixed state as described above, the UE may change a method for determining the cell (re)selection depending on the UE movement speed (e.g., the number of times of cell movements through the cell (re)selection within a predetermined time). For example, in case of a fast moving UE, the corresponding determination should be quickly made, and it may be necessary to relatively shorten the measurement time required to determine the cell (re)selection.

Generally, in case of the fast moving UE, since a broadcasting value (q-HystSF) of the base station is added to the received signal strength of the current cell (the broadcasting value is actually a negative value, it is subtracted from the received signal strength), it is determined that the received signal strength of the current base station is relatively lower than that of the neighboring cell, and thus the probability to select the neighboring cells is increased. However, in case of considering the stationary UE as in the disclosure, the base station may separately indicate a value related to the q-HystSF and the measurement time length for the corresponding UE. Further, if the value related to the q-HystSF and the measurement time length for the corresponding UE is not separately indicated, the UE may always use a specific value (e.g., normal mobility value) regardless of the information being broadcasted.

Figure 5:
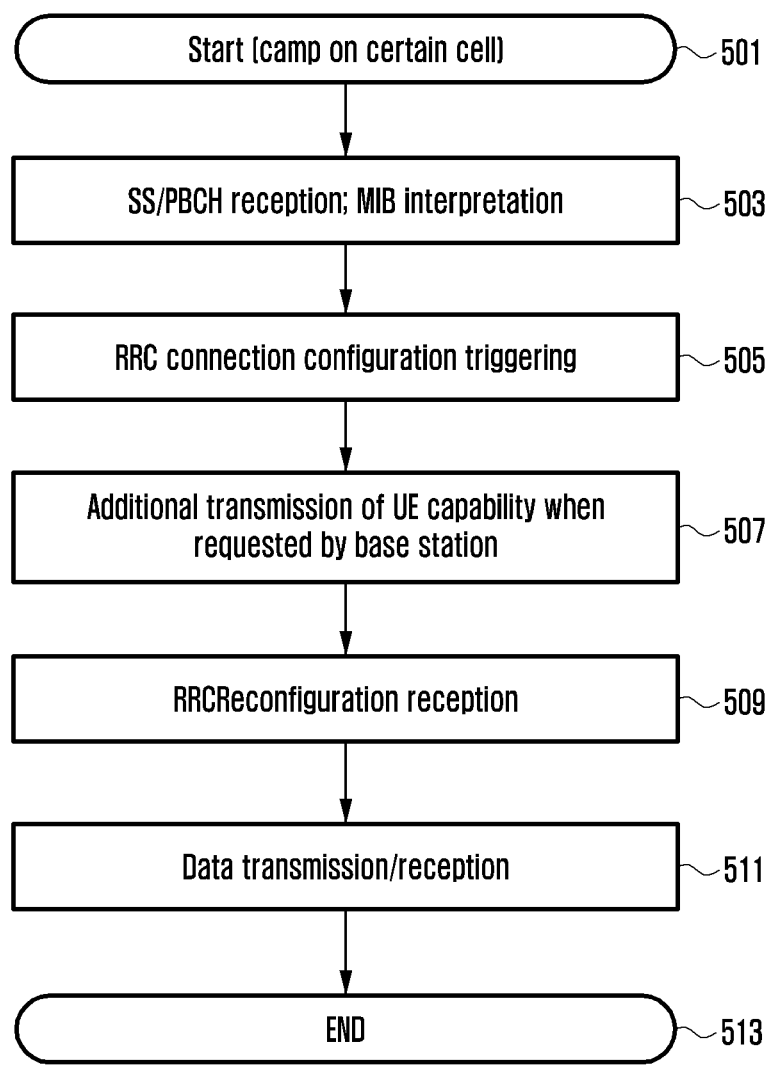
FIG. 5 is a diagram illustrating the order of operations of a UE in order for a stationary NR-lite UE to perform a connection to a network according to an embodiment of the disclosure.

FIG. 5 is a diagram illustrating the order of operations of a UE in order for a stationary NR-lite UE to perform a connection to a network according to an embodiment of the disclosure.

Figure 6:
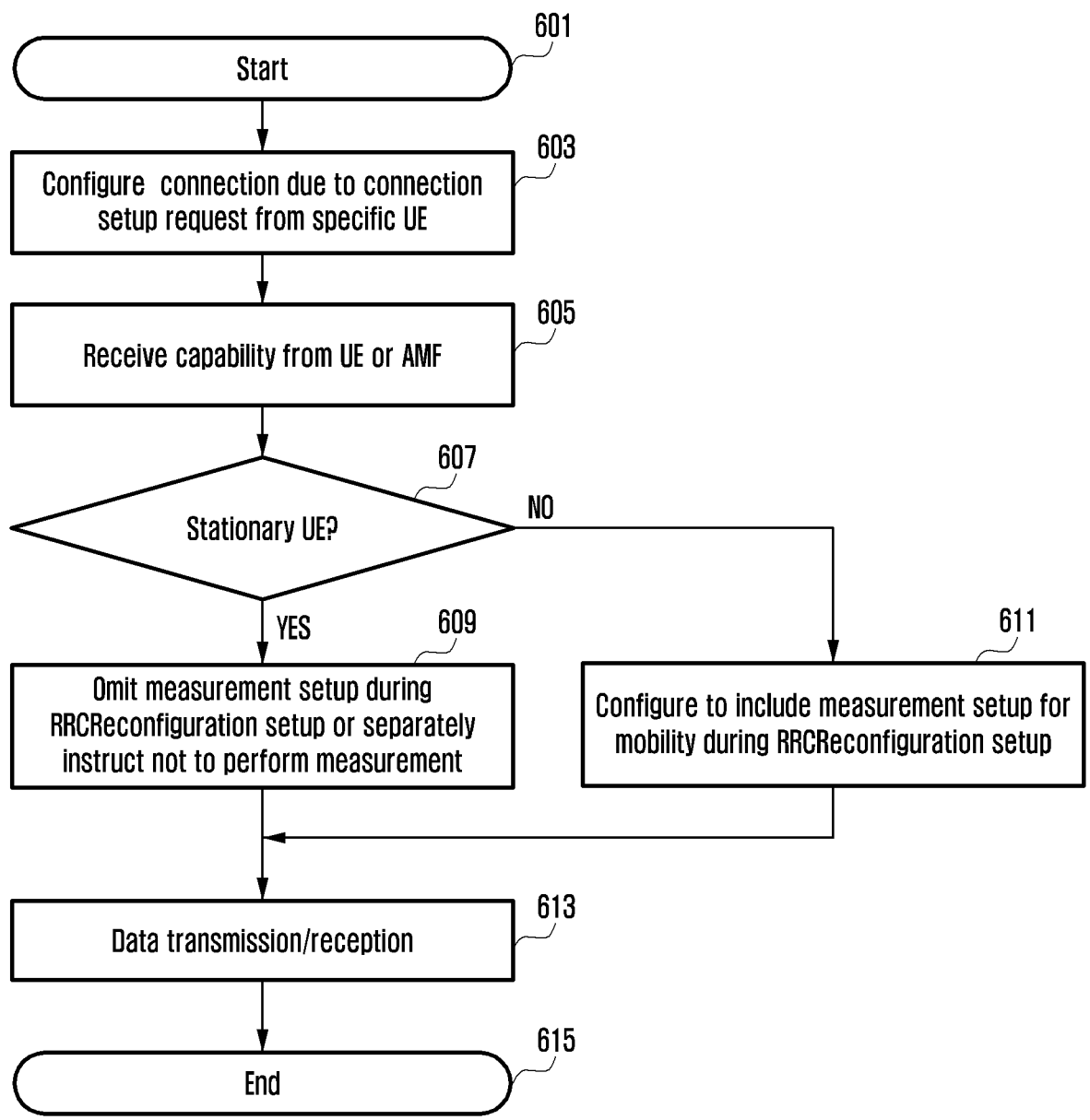
FIG. 6 is a diagram illustrating the order of operations of a base station in order for a stationary NR-lite UE to perform a connection to a network according to an embodiment of the disclosure.

FIG. 6 is a diagram illustrating the order of operations of a base station in order for a stationary NR-lite UE to perform a connection to a network according to an embodiment of the disclosure.

With reference to FIG. 5, although description is made on the assumption that a UE in a first power-on state accesses a network, the contents of the disclosure are not limited to the corresponding contents. A stationary NR-lite UE in an idle state may select and camp on a base station that supports the NR-lite through reception of MIB and SIB1 transmitted by the base station (501), and may attempt a connection setup to the base station for registration in the network (505). During the connection setup, the UE may transmit a connection setup request message (RRCSetupRequest) of an RRC layer while performing the random access procedure to the base station, receive a connection setup message (RRCSetup) from the base station, and complete the RRC connection setup procedure by retransmitting a connection setup complete message (RRCSetupComplete) to the base station (411). In this case, the UE may report a mobility state of the UE in the idle state in the connection setup complete message, and in this case, may notify that the UE is a stationary UE (in a fixed state or in a stationary state). Although not illustrated in the drawing, the mobility information of the UE may also be included in a resume complete message (RRCResumeComplete) that is a message being used when the UE is transitioned from the idle state (RRC_IDLE) and an inactive state (RRC_INACTIVE) of the connected state to the connected state (RRC_CONNECTED). Further, as a part of transmitting information on previously visited cells (visitedCellInfoList) in order to provide the UE mobility state information to the base station after the UE is transitioned to the connected state, it may be notified that the UE is in the stationary state or in the fixed state in UEAssistanceInformation. In order to determine whether the UE is in the stationary state or in the fixed state, the UE may determine whether the UE is in the stationary state or in the fixed state in accordance with the previously configured information through the memory of the UE. Further, the UE may determine whether the UE is in the stationary state or in the fixed state in accordance with the number of times of (re)selections while the UE moves among cells in a predetermined time. Further, it is possible to report the stationary state or the fixed state in the RRCSetupComplete and RRCResumeComplete messages only in case that information that the base station supports the UE in the stationary state or in the fixed state is transmitted as an SIB message. If the base station does not transmit the information that the base station supports the UE in the stationary state or the UE in the fixed state to the UE, the UE is unable to report the stationary state or the fixed state to the base station, and thus the UE may report the mobility related information in accordance with the number of times of (re)selections while the UE moves among the cells in the predetermined time, or may report information on always normal mobility or low mobility.

Meanwhile, the connection setup complete message (RRCSetupComplete) may include a registration request message that is transmitted to a core network, and the registration request message may be included in an INITIAL UE message that is a message between the base station and the AMF, and may be transmitted to the AMF. If it is notified that the UE is in the stationary state or in the fixed state in the connection setup complete message (RRCSetupComplete) as in the above example, the base station may include the corresponding information in the INITIAL UE message and may transmit the INITIAL UE message.

The AMF having received the corresponding message may transmit an initial context setup request message to the base station in order to complete the registration of the corresponding UE. If the UE has already been registered, the AMF stores UE radio capability information received from the UE, and thus may include the UE radio capability information in the initial context setup request message to be transferred to the base station. However, in the present exemplary drawing, since the UE initially accesses the network in the scenario, the AMF is in a state where it has not yet obtained the UE radio capability information of the corresponding UE. Accordingly, the UE may transmit, to the base station 403, the initial context setup request message that does not include the UE radio capability information.

In order to be able to perform communication with the UE, the base station should be aware what kind of capability the UE has, and thus may transmit a UECapabilityEnquiry message of an RRC layer to the UE in order to request the UE radio capability information from the UE. The UE having received this may include the UE radio capability information owned by the UE in a UECapabilityInformation message of the RRC layer, and may transmit the UECapabilityInformation message to the base station (507). In this case, the UE may notify that the UE is an NR-lite UE, and may additionally notify whether the corresponding UE is in the stationary state or in the fixed state. The UE radio capability information for notifying whether the UE is in the stationary state or in the fixed state may be a parameter that can be commonly configured without distinction between FDD and TDD, and may be a parameter that can be commonly configured without distinction between FR1 having the operating frequency of 7 GHz or less and FR2 having the operating frequency of 7 GHz or more.

The base station having received the UE radio capability information may store the received information in the base station, and then the AMF may store the corresponding information in order to reuse the same thereafter. Accordingly, the base station may include UE radio capability information element (IE) (information transfer unit in a message) in a UE RADIO CAPABILITY INFO INDICATION message to be transferred to the AMF (425). Further, the base station may utilize the corresponding information in a paging transfer procedure. Based on the UE radio capability information received from the UE, information notifying whether the UE is in the stationary state or in the fixed state may be included in a UE Radio Capability for Paging IE, and may be transmitted to the AMF, and information on a location accessed by the corresponding UE (e.g., base station identifier or physical channel identifier) may be included and may be additionally transmitted.

Thereafter, functions are configured in accordance with the RRC configuration information received from the base station (509), and data transmission/reception may be performed (511).

Meanwhile, with reference to FIG. 6, in case of determining to accept the connection request from a specific UE, the base station may permit the connection (603). Thereafter, if the UE capability is not received from the AMF as described above, the base station may request and receive the UE capability from the UE, whereas if the AMF has stored the UE capability, the base station may receive the corresponding information from the AMF (605). Accordingly, when configuring various kinds of functions to the UE based on the corresponding information, the base station may not configure the function necessary for the mobility (607). For example, in order to determine whether it is necessary for the UE to move to another base station, the base station may configure the UE to report the result of measuring the signal strength of a neighboring base station in accordance with a specific condition. The above procedure becomes possible through the RRCReconfiguration message of the RRC layer (611).

However, in case that the UE is in the stationary state or in the fixed state as described above, the base station may configure the UE not to measure the signal strength of the neighboring base station (609). Furthermore, the base station may implicitly include an indicator for causing the UE not to perform the related measurement in the RRCReconfiguration message to be transmitted. The UE having received the RRCReconfiguration message may transmit an RRCReconfigurationComplete message notifying that the UE has successfully received the message. Thereafter, the base station may perform data transmission/reception with the corresponding UE in accordance with the configured information (613).

Figure 7:
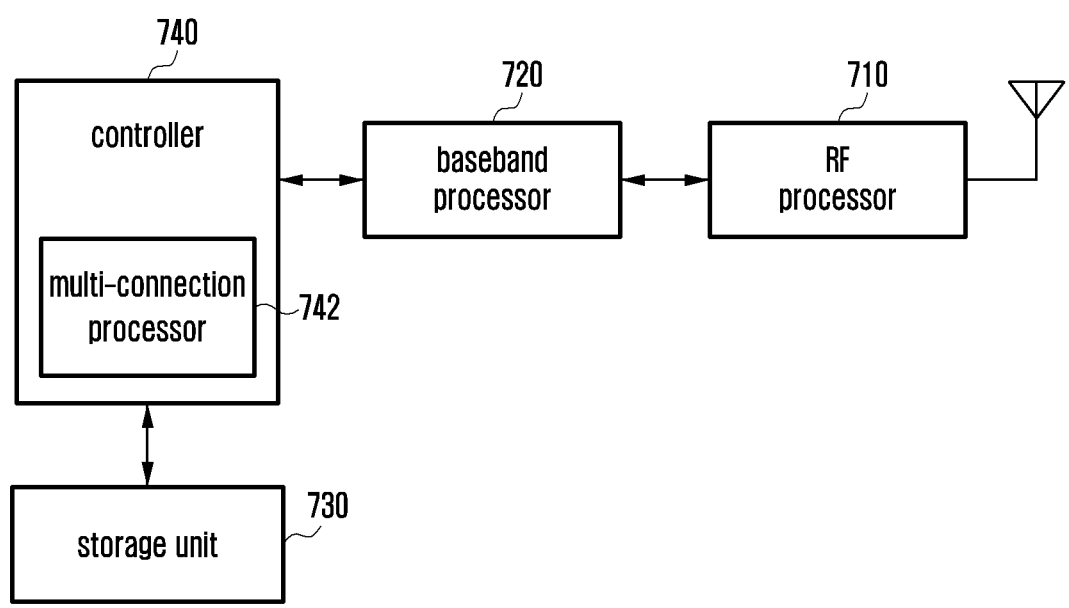
FIG. 7 is a diagram illustrating an internal structure of a UE in a wireless communication system according to an embodiment of the disclosure.

FIG. 7 is a diagram illustrating an internal structure of a UE in a wireless communication system according to an embodiment of the disclosure.

With reference to FIG. 7, the UE may include a radio frequency (RF) processor 710, a baseband processor 720, a storage unit 730, and a controller 740.

The RF processor 710 may perform a function for transmitting and receiving a signal on a radio channel, such as signal band conversion and amplification. That is, the RF processor 710 may perform up-conversion of a baseband signal provided from the baseband processor 720 into an RF-band signal to transmit the converted signal through an antenna, and may perform down-conversion of the RF-band signal received through the antenna into a baseband signal. For example, the RF processor 710 may include a transmission filter, a reception filter, an amplifier, a mixer, an oscillator, a digital-to-analog converter (DAC), and an analog-to-digital converter (ADC). Although only one antenna is illustrated in FIG. 7, the UE may be provided with a plurality of antennas. Further, the RF processor 710 may include a plurality of RF chains. Further, the RF processor 710 may perform beamforming. For the beamforming, the RF processor 710 may adjust phases and sizes of signals being transmitted or received through the plurality of antennas or antenna elements.

The baseband processor 720 may perform a conversion function between a baseband signal and a bit string in accordance with the physical layer standard of the system. For example, during data transmission, the baseband processor 720 may generate complex symbols by encoding and modulating a transmitted bit string. Further, during data reception, the baseband processor 720 may restore a received bit string by demodulating and decoding the baseband signal provided from the RF processor 710. For example, in case of following an orthogonal frequency division multiplexing (OFDM) method, during data transmission, the baseband processor 720 may generate complex symbols by encoding and modulating a transmitted bit string, perform mapping of the complex symbols onto subcarriers, and then configure OFDM symbols through the inverse fast Fourier transform (IFFT) operation and cyclic prefix (CP) insertion. Further, during data reception, the baseband processor 720 may divide the baseband signal being provided from the RF processor 710 in the unit of OFDM symbols, restore the signals mapped onto the subcarriers through the fast Fourier transform (FFT) operation, and then restore the received bit string through demodulation and decoding.

The baseband processor 720 and the RF processor 710 may transmit and receive the signals as described above. Accordingly, the baseband processor 720 and the RF processor 710 may be called a transmitter, a receiver, a transceiver, or a communication unit. Further, in order to support different radio access technologies, at least one of the baseband processor 720 and the RF processor 710 may include a plurality of communication modules. Further, in order to process signals of different frequency bands, at least one of the baseband processor 720 and the RF processor 710 may include different communication modules. For example, the different radio access technologies may include a wireless LAN (e.g., IEEE 802.11) and a cellular network (e.g., LTE). Further, the different frequency bands may include super high frequency (SHF) (e.g., 2.5 GHz or 5 GHz) band and millimeter wave (e.g., 60 GHz) band.

The storage unit 730 may store therein a basic program for an operation of the UE, application programs, and data of configuration information. In particular, the storage unit 730 may store information related to a wireless LAN node that performs wireless communication by using a wireless LAN access technology. Further, the storage unit 730 may provide stored data in accordance with a request from the controller 740.

The controller 740 may control the overall operation of the UE. For example, the controller 740 may transmit and receive signals through the baseband processor 720 and the RF processor 710. Further, the controller 740 may record and interpret data in the storage unit 730. For this, the controller 740 may include at least one processor. For example, the controller 740 may include a communication processor (CP) performing a control for communication and an application processor (AP) controlling a higher layer, such as an application program. According to an embodiment of the disclosure, the controller 740 includes a multi-connection processor 742 performing a process for operating in a multi-connection mode. For example, the controller 740 may control the UE to perform the procedure illustrated as an operation of the UE illustrated in FIG. 5.

The controller 740 according to an embodiment of the disclosure may provide information so as to be referred to during configuration and paging information transmission in the network by notifying the network that the corresponding UE is a fixed UE or a stationary UE during the network access or capability transmission through values in the received MIB and SIB1.

Methods according to the claims or the embodiments described in the specification may be implemented in the form of hardware, software, or a combination of hardware and software.

For example, the base station may include the transceiver and the controller (processor).

In case of implementation by software, a computer readable storage medium storing one or more programs (software modules) may be provided. The one or more programs stored in the computer readable storage medium may be configured for execution by one or more processors in the electronic device. The one or more programs include instructions causing the electronic device to execute the methods according to the claims of the disclosure or the embodiments described in the specification.

Such programs (software modules or software) may be stored in a nonvolatile memory including a random access memory and a flash memory, a read only memory (ROM), an electrically erasable programmable read only memory (EEPROM), a magnetic disc storage device, a compact disc-ROM (CD-ROM), a digital versatile discs (DVDs), or other types of optical storage devices, and a magnetic cassette. Further, the programs may be stored in a memory composed of a combination of some or all of them. Further, a plurality of memories may be included in the respective configurations.

Further, the programs may be stored in an attachable storage device that can be accessible through a communication network composed of the Internet, Intranet, local area network (LAN), a wide LAN (WLAN), or a communication network, such as a storage area network (SAN), or a communication network composed of a combination thereof. Such a storage device may be connected to a device that performs an embodiment of the disclosure through an external port. Further, a separate storage device on a communication network may be connected to the device that performs the embodiment of the disclosure.

In the above-described detailed embodiments of the disclosure, the elements included in the disclosure may be expressed in the singular or plural form depending on the proposed detailed embodiment. However, the singular or plural expression has been selected suitably for a situation proposed for convenience of description, and the disclosure is not limited to the singular or plural elements. Although an element has been expressed in the plural form, it may be configured in the singular form. Although an element has been expressed in the singular form, it may be configured in the plural form.

Although specified embodiments have been described in the detailed description of the disclosure, the disclosure may be modified in various ways without departing from the scope of the disclosure. Accordingly, the scope of the disclosure should not be limited to the above-described embodiments, but should be defined by not only the claims but also equivalents thereof.

The invention claimed is:

1. A method performed by a user equipment (UE) in a wireless communication system, the method comprising:
   transmitting, to a base station, a UE capability information message including information indicating that the UE is in a fixed state;
   based on the information included in the UE capability information message, receiving, from the base station, a first radio resource control (RRC) message including information for configuring the UE not to perform a measurement for a signal strength of a neighbor base station;
   transmitting, to the base station, a second RRC message as a response to the first RRC message;
   receiving, from the base station, a third RRC message for transitioning the UE to an RRC idle state;
   based on the third RRC message, transitioning to the RRC idle state; and
   receiving a paging message in the RRC idle state, wherein the UE in the fixed state receives the paging message from the base station which the UE performed the last access.

2. The method of claim 1, wherein the fixed state of the UE is determined based on a number of times of cell reselections in a predetermined time.

3. A method performed by a base station in a wireless communication system, the method comprising:
   receiving, from a user equipment, a user equipment (UE) capability information message including information indicating that the UE is in a fixed state;
   based on the information included in the UE capability information message, transmitting, to the UE, a first radio resource control (RRC) message including information for configuring the UE not to perform a measurement for a signal strength of a neighbor base station;
   receiving, from the UE, a second RRC message as a response to the first RRC message; and
   transmitting, to the UE, a third RRC message for transitioning the UE to an RRC idle state,
   wherein the UE in the fixed state receives a paging message from the base station which the UE performed the last access, in the RRC idle state.

4. The method of claim 3, wherein the fixed state of the UE is determined based on a number of times of cell reselections in a predetermined time.

5. The method of claim 3, further comprising:
   transmitting, to an access and mobility management function (AMF) entity, a UE radio capability information indication message including the information indicating that the UE is in the fixed state.

6. A user equipment (UE) in a wireless communication system, the UE comprising:
   a transceiver; and
   a controller coupled with the transceiver, and configured to:

transmit, to a base station, a UE capability information message including information indicating that the UE is in a fixed state, based on the information included in the UE capability information message, receive, from the base station, a first radio resource control (RRC) message including information for configuring the UE not to perform a measurement for a signal strength of a neighbor base station, transmit, to the base station, a second RRC message as a response to the first RRC message, receive, from the base station, a third RRC message for transitioning the UE to an RRC idle state, based on the third RRC message, transition to the RRC idle state, and receive a paging message in the RRC idle state, wherein the UE in the fixed state receives the paging message from the base station which the UE performed the last access.

7. The UE of claim 6, wherein the fixed state of the UE is determined based on a number of times of cell reselections in a predetermined time.

8. A base station in a wireless communication system, the base station comprising:

a transceiver; and a controller coupled with the transceiver, and configured to:

receive, from a user equipment, a user equipment (UE) capability information message including information indicating that the UE is in a fixed state, based on the information included in the UE capability information message, transmit, to the UE, a first radio resource control (RRC) message including information for configuring the UE not to perform a measurement for a signal strength of a neighbor base station, receive, from the UE, a second RRC message as a response to the first RRC message, and transmit, to the UE, a third RRC message for transitioning the UE to an RRC idle state, wherein the UE in the fixed state receives a paging message from the base station which the UE performed the last access, in the RRC idle state.

9. The base station of claim 8, wherein the fixed state of the UE is determined based on a number of times of cell reselections in a predetermined time.

10. The base station of claim 8, wherein the controller is further configured to:

transmit, to an access and mobility management function (AMF) entity, a UE radio capability information indication message including the information indicating that the UE is in the fixed state.

* * * * *